Jan. 22, 1963  W. G. MILLER  3,074,125
BAY WINDOW ASSEMBLY FOR HOUSE TRAILERS AND THE LIKE
Filed Feb. 8, 1960  2 Sheets-Sheet 1
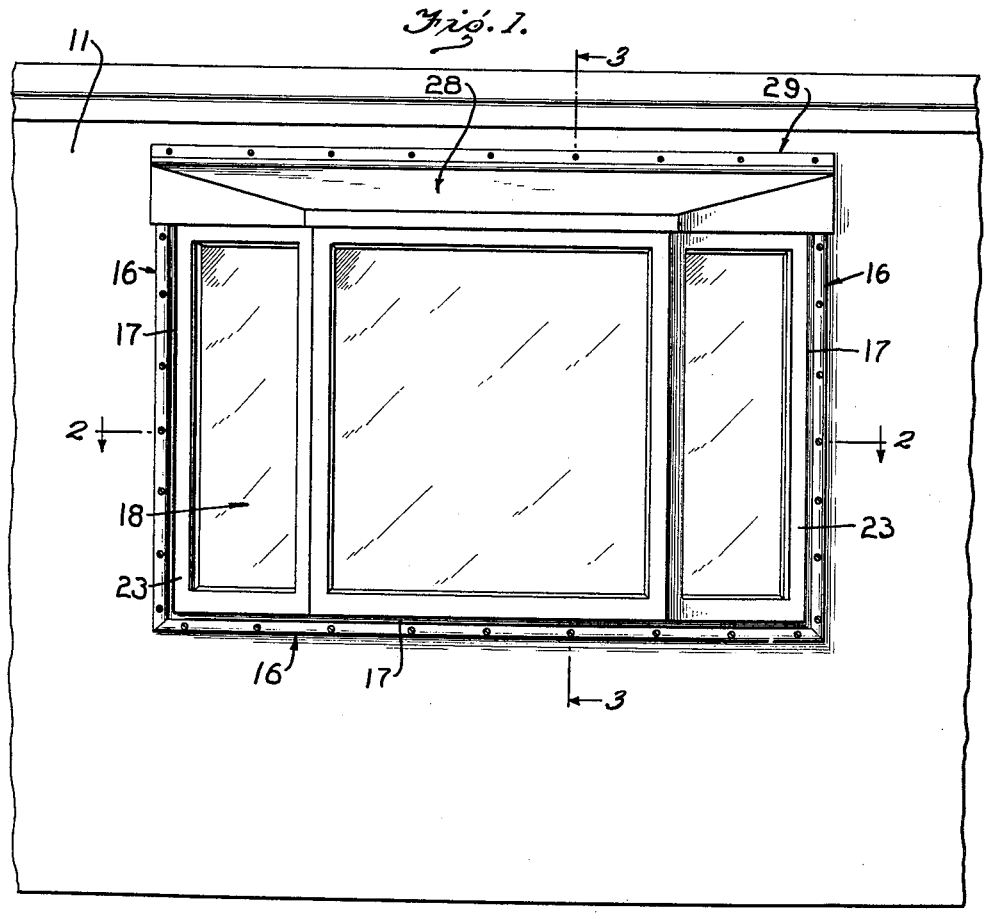
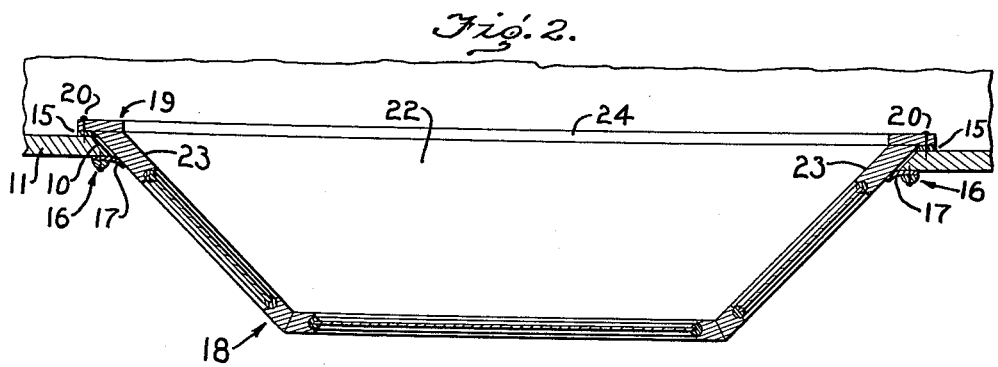
INVENTOR
Wayne G. Miller
BY Roy A. Plant
ATTORNEY

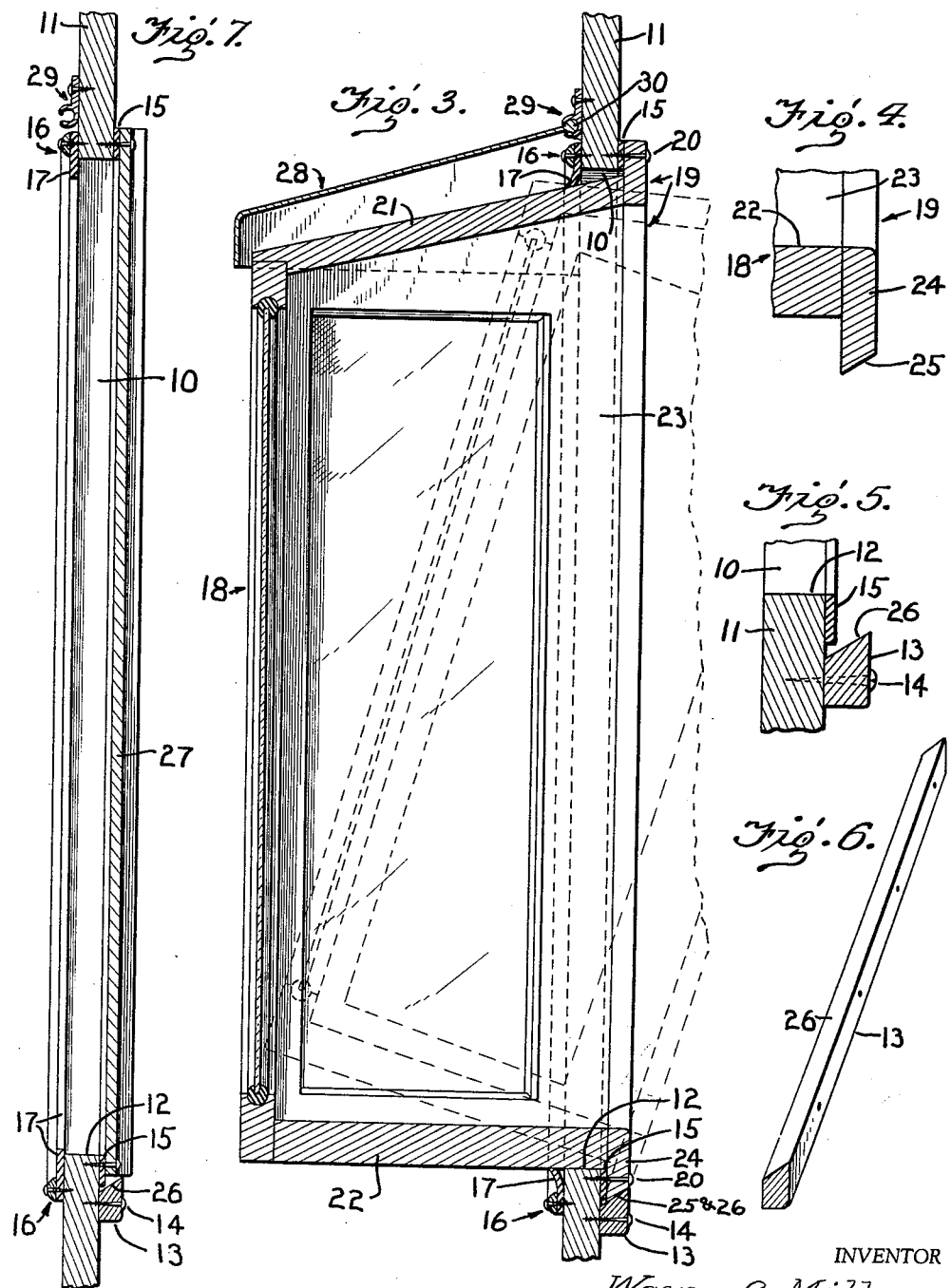

United States Patent Office 3,074,125
Patented Jan. 22, 1963

3,074,125
BAY WINDOW ASSEMBLY FOR HOUSE TRAILERS AND THE LIKE
Wayne G. Miller, Clarion, Pa., assignor to Divco-Wayne Industries, Inc., New York, N.Y.
Filed Feb. 8, 1960, Ser. No. 7,430
9 Claims. (Cl. 20—40)

This invention relates broadly to house trailers or mobile homes having bay windows, and more specifically to house trailers having bay windows which are inwardly removable to non-projecting position for traveling along a highway and are restorable to normal projecting position when the destination is reached at which the trailer is to be used as a home, office or the like.

Heretofore, more or less complicated and expensive structures have been provided for permitting movement of the bay windows to and from normal projecting position. Some of these constructions have dealt with outwardly removable and reversible bay windows, while others have involved rotatable windows with fixed projecting frames which would be difficult to remove, and which are almost impossible to make air-tight or water-tight in driving storms. It was the recognition of this situation and a knowledge of what had been done along this line together with the shortcomings of same which led to the conception and development of the present invention.

Accordingly among the objects of the present invention is the provision of an extremely simple, and relatively inexpensive, yet an entirely adequate construction involving a house trailer with a special form of tightly sealable, easily removable and replaceable bay window.

A window opening is provided, in accordance with the present invention, in the trailer side wall, and a bay window unit extends outwardly through said opening and is removably secured to said side wall. When highway travel is required, the bay window unit is released and bodily moved back into the trailer and remains therein until the destination has been reached. Then, the bay window unit is lifted and extended out through the window opening and then re-secured.

An important object of the invention is to provide a novel construction which permits gravity to so act on the bay window unit as to assure that this unit shall not tilt or fall from its initially placed position before it can be secured in place. In attaining this end, a further object is to provide the inner portion of the bay window unit with sidewise projecting means to limit the outward movement of said unit through the window opening, to include a lower horizontal member in said projecting means, to provide a fixed rail under the window opening upon which said lower horizontal member is to be seated, and to so shape the contacting edges of said horizontal member and rail that they will cooperate in holding the lower end of the bay window against inward movement from the position in which it is initially placed. The horizontal member and rail thus coact to support the initially placed bay window unit inwardly of its center of gravty, wth the result that gravity tends to tilt said unit outwardly to its normal projecting position, thereby holding the aforesaid projecting means against the inner face of the trailer wall and preventing inward tilting or falling of the bay window unit before it can be secured.

Another object is to include an inner trim frame in the bay window unit, said trim frame constituting the aforesaid projecting means all the way around the inner edge of the bay window and being secured by screws or the like to the trailer side wall to fasten the entire unit in place.

Another object is to provide for effectively sealing against weather leakage between the bay window unit and the trailer side wall.

A still further object is to provide a roof-forming cowl secured to the trailer side wall and receiving the upper end of the bay window unit to protect it against the elements and prevent possible driving-in of rain at the otherwise exposed upper end of said bay window unit, said cowl being removable when said unit is removed and being readily placeable within the trailer.

Yet another object is to provide for tightly closing the window opening after the bay window unit has been removed.

Still further objects and advantages of the invention will appear as the description proceeds.

To the accomplishment of the foregoing and related ends, the invention, then, consists of the house trailer and bay window construction hereinafter fully described and particularly pointed out in the claims, the annexed drawings and the following description setting forth in detail certain means for carrying out the invention, such disclosed means illustrating, however, but one of the various ways in which the principle of the invention may be used.

In the annexed drawings:

FIGURE 1 is a side elevation showing the invention from the outside of the house trailer or mobile home.

FIGURE 2 is an enlarged horizontal sectional view as taken on line 2—2 of FIGURE 1, looking in the direction of the arrows.

FIGURE 3 is a further enlarged vertical section view as taken on line 3—3 of FIGURE 1, looking in the direction of the arrows.

FIGURE 4 is an enlarged detail vertical sectional view through the inner lower edge portion of the bay window unit.

FIGURE 5 is an enlarged detail vertical sectional view through the horizontal rail and other structure at the lower edge of the window opening.

FIGURE 6 is a sectional perspective view showing a portion of the horizontal rail, mountable at the lower inner edge of the window opening.

FIGURE 7 is a vertical sectional view through the window opening showing the manner of closing the window opening ready for traveling upon removal of the bay window unit.

The general construction shown in the drawings may be considered as preferred and will be rather specifically described, but it is to be understood that variations may well be made within the spirit and scope of the invention as herein set forth.

A preferably rectangular window opening 10 is formed in the trailer side wall 11, with the lower edge 12 of said opening disposed substantially horizontally. A horizontal rail 13 is secured by screws 14 against the inner side of the trailer side wall 11 and is substantially parallel to and downwardly spaced from the lower edge 12 of the window opening 10, said rail being preferably of about the same length as said opening.

A yieldable sealing gasket 15 is cemented or otherwise suitably fastened against the inner side of the trailer side wall 11 and surrounds the window opening 10; and additional sealing means 16 is secured against the outer side of said wall 11 around said opening 10. The sealing means 16 includes a resilient, flap-type, weather strip 17.

A bay window unit 18 extends outwardly through the window opening 10 and includes an inner trim frame 19 which projects in a flange-like manner and lies against the gasket 15. Suitable fastening means, such as screws 20, extend through the trim frame 19 and gasket 15 and into the trailer side wall 11 to removably secure the bay window unit 18 to said wall 11, with the top 21, bottom 22, and side members 23 of said unit in sealing engagement with the weather strip 17.

The lower member 24, FIGURE 4, of the trim frame 19 has a beveled lower edge 25; and the rail 13 has a correspondingly beveled upper edge 26, FIGURE 5, upon which said beveled lower edge 25 rests. The two edges 25 and 26 are beveled in a plane which declines toward the trailer side wall 11 and said edges cooperate in holding the lower end of the bay window unit 18 against inward shifting when said unit is initially placed in the opening 10. At this time, the weight of the unit 18 is supported by the rail 13 and as this rail is spaced inwardly from the center of gravity of said unit 18, gravity tends to outwardly tilt the initially placed unit, thereby holding the trim frame 19 against the gasket 15 and allowing driving of the first of the anchoring screws 20 without difficulty, to initially secure said unit. Securing may then be easily completed by driving the rest of the screws 20. The coacting beveled edges 25 and 26 also assure that the bay window unit 18 shall not accidentally fall inward when the screws 20 are removed, in preparation for removing the unit 18 and placing it in the trailer when the latter is to be drawn along a highway.

After removal of the screws 20, the bay window unit 18 may be inwardly tilted as shown in dotted lines in FIGURE 3 and then easily lifted from the rail 13 and lowered onto the floor. In replacing the unit 18, it may be lifted and engaged with the rail 13 in a tilted position, as shown by the dotted lines, and then swung outwardly into position for fastening, and gravity will hold it in this position to facilitate driving of the first of the anchoring screws 20.

After removal of the bay window unit 18, the window opening 10 may be closed by a panel 27, FIGURE 7. This panel is secured against the gasket 15 by screws; and the previously mentioned anchoring screws 20 may be employed. The gasket 15 forms an effective weather seal between the panel 27 and the inner face of the trailer wall as long as said panel is in use, and when the bay window unit 18 is re-installed, said gasket 15 coacts with the weather strip 17 in excluding wind and rain.

A downwardly open cowl 28 is mounted on the outer face of the trailer wall 11 and the top or body member portion of same receives the upper end of the bay window unit 18 to act as a decorative as well as a protective roof. To mount this cowl 28, preferably a channeled bar 29 is secured to the trailer wall 11 over the window opening 10, and said cowl is provided with a bead 30 received in the channel of said channeled bar 29. When the bay window unit 18 has been removed, the cowl 28 may be slid longitudinally to remove its bead 30 from the bar 29, thus detaching the cowl to be placed in the trailer while traveling. When the destination is reached, the cowl may be easily re-installed and the bay window unit 18 easily re-secured in place under same.

From the foregoing, it will be seen that novel and advantageous construction has been disclosed for attaining the desired ends. However, attention is again invited to the possibility of making variations within the spirit and scope of the invention as shown and described.

Other modes of applying the principle of my invention may be employed instead of the one explained, change being made as regards the bay window construction herein disclosed, provided the means stated by any of the following claims or the equivalent of such stated means be employed.

I therefore particularly point out and distinctly claim as my invention:

1. A substantially vertical trailer wall having a window opening provided with a substantially horizontal lower edge, a horizontal rail secured against the inner side of said trailer wall substantially parallel to and downwardly spaced from said lower edge of said window opening, a bay window unit extending outwardly through said window opening and including projecting means in abutting relation with the inner side of said trailer wall to prevent excessive outward movement of said bay window unit when initially placing it in said opening and thereafter, said projecting means including a horizontal member having a lower edge disposed directly on the upper edge of the aforesaid rail, these edges being cooperatively shaped to prevent the lower end of said bay window unit from shifting inwardly when said bay window unit has been initially placed in said window opening and to so support the initially placed bay window unit that gravity will act to hold it in place while it is being secured to said trailer wall, and securing means removably securing said bay window unit to said trailer wall.

2. A structure as specified in claim 1, in which said cooperatively shaped edges are beveled in a plane declining to said trailer wall.

3. A structure as specified in claim 1, in which said bay window unit is provided with an inner trim frame which constitutes said projecting means, and in which said securing means comprises screws extending through said trim frame into said trailer wall.

4. A structure as specified in claim 1, in which said bay window unit is provided with an inner trim frame which constitutes said projecting means, and in which said securing means comprises screws extending through said trim frame into said trailer wall, and in which said cooperatively shaped edges are beveled in a plane declining to said trailer wall.

5. A bay window unit having an open face with top, bottom, and side edges ready for installation in a suitable opening in a wall, said bay window unit having an outwardly extending flange in a common plane all the way around its open face, whereby said flange may be used for anchoring said bay window unit to the inner face of the wall along the edges of said opening, wherein said flange along the bottom edge of said unit tapers down and toward the under side of said unit, whereby said tapered bottom edge portion may cooperate with a similar tapered member along the inner side of the bottom edge of said opening for supporting and holding said unit until same can be fixedly anchored to said wall while projecting out through same.

6. A substantially vertical trailer wall having a window opening, a bay window extending outwardly through said window opening and including an inner trim frame secured to said trailer wall, a sealing gasket clamped between said trim frame and said trailer wall, and additional sealing means secured to the outer side of said trailer wall and surrounding said window opening, said additional sealing means including a yieldable weather strip contacting with and pressing against said bay window unit.

7. A substantially vertical trailer wall having a window opening, a bay window unit extending outwardly through said opening and having a projecting flange lapping the inner face of said trailer wall around said opening, a yieldable gasket clamped between said flange and said wall, and screws extending through said flange and gasket and into said wall to removably secure said bay window unit to said wall, said gasket being secured to said wall; whereby, upon removal of said bay window unit from said window opening, said gasket will remain in place and a temporary closure panel for said window opening may then be secured against said gasket.

8. A bay window unit having an open face with top, bottom, and side edges rigidly joined together ready for installation in a suitable opening in a wall, said bay window unit being a little wider at its inner edge than said opening and additionally having an outwardly extending flange in a common plane all the way around its open face in position to overlie the inner face of said wall around said opening, whereby said flange may be used for anchoring said bay window unit to the inner face of the wall along the edges of said opening.

9. In an assembly of a bay window and cowl, the combination wherein said cowl has a wall mountable bar having a hollow channel member along its lower front edge, said channel having an outwardly opening, substantially straight and narrow slit on its front face adjacent the top of said bay window, said channel also being open at least on one end, and a cowl body member having side panels and an outwardly and downwardly sloping top, said side panels resting against said wall and holding said cowl body member in extended position, the rear top edge of said cowl body member having a straight line bead of a size to tightly but slidably fit the hollow portion of said channel member with the edge of said top panel adjacent said bead extending through the slit of said channel, whereby when said cowl is mounted over and closely adjacent the top of the bay window it will supply protection for the upper portion of the latter.

References Cited in the file of this patent

UNITED STATES PATENTS

| | | |
|---|---|---|
| 568,041 | Quackenboss | Sept. 22, 1896 |
| 1,380,237 | Neff | May 31, 1921 |
| 2,137,290 | Huckstep et al. | Nov. 22, 1938 |
| 2,311,550 | Kauffman | Feb. 16, 1943 |
| 2,333,574 | Kauffman | Nov. 2, 1943 |
| 2,506,285 | Wagner | May 2, 1950 |
| 2,892,498 | Lee | June 30, 1959 |

FOREIGN PATENTS

| | | |
|---|---|---|
| 1,045,133 | France | June 24, 1953 |